(12) United States Patent
Wigren et al.

(10) Patent No.: US 8,200,250 B2
(45) Date of Patent: Jun. 12, 2012

(54) TRANSFORMATION OF POSITIONING REPORTING FORMATS

(75) Inventors: Torbjorn Wigren, Uppsala (SE); Ari Kangas, Lidingo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 281 days.

(21) Appl. No.: 12/595,413

(22) PCT Filed: Apr. 11, 2007

(86) PCT No.: PCT/SE2007/050237
§ 371 (c)(1),
(2), (4) Date: Oct. 9, 2009

(87) PCT Pub. No.: WO2008/127159
PCT Pub. Date: Oct. 23, 2008

(65) Prior Publication Data
US 2010/0109952 A1    May 6, 2010

(51) Int. Cl.
*H04W 24/00* (2009.01)

(52) U.S. Cl. ............ 455/456.5; 455/456.1; 455/456.6

(58) Field of Classification Search ....... 455/456.1–457; 342/357.31, 457
See application file for complete search history.

(56) References Cited

U.S. PATENT DOCUMENTS

| 7,714,778 | B2 * | 5/2010 | Dupray | 342/357.31 |
| 7,715,849 | B2 * | 5/2010 | Spirito et al. | 455/456.1 |
| 2003/0146871 | A1 * | 8/2003 | Karr et al. | 342/457 |
| 2011/0159893 | A1 * | 6/2011 | Siomina et al. | 455/456.3 |

FOREIGN PATENT DOCUMENTS
GB    2354387 A    3/2001

* cited by examiner

*Primary Examiner* — Sharad Rampuria

(57) ABSTRACT

The present invention relates to a method and arrangement for achieving transformations of received positioning information according to a first reporting format to positioning information according to a second format such as to allow a seamless transformation and handling of the positioning confidence values, i.e. the probability that the terminal is actually located in the region determined by the applied positioning method. The method derives an approximation of the shape-defining parameters for the second reporting format such as to minimize a criterion function including the predefined target confidence value and determining the deviation of the confidence value for the approximated shape from the target confidence value.

19 Claims, 9 Drawing Sheets

TRANSFORMATION OF POSITIONING REPORTING FORMATS

TECHNICAL FIELD OF THE INVENTION

The present invention relates to methods and arrangements in the field of positioning and navigation in cellular systems.

BACKGROUND

All cellular communication systems are divided into cells, wherein user equipments (UE) are served by one base station or, when in soft handover, several base stations. Each base station may serve UEs in more than one cell. The position of a certain UE is given with respect to a specified coordinate system. A substantial number of positioning methods of varying sophistication have been suggested over the years.

Today, the cell ID positioning method, which determines the terminal position with cell granularity, represents the backbone low-end approach in the majority of the cellular systems. The method has the advantage of an instantaneous response and availability wherever there is cellular coverage. Due to the advantages of the cell ID method, attempts have been made to enhance its accuracy while maintaining the benefits. The most promising attempt is to augment the cell ID method with an assessment of the round trip time (RTT), i.e. the travel time of a data packet back and forth between the terminal and the base station. Together, this defines a truncated circular strip around the base station and has been denoted an ellipsoid arc in the document 3GPP TS 23.032 V.4.0.0, "Universal Geographical Area Description" (April, 2001) issued by the $3^{rd}$ Generation partnership project (3GPP).

The dominating high-accuracy positioning method in almost all cellular systems is the Assisted Global Positioning Satellite (A-GPS) method. A-GPS is an enhancement of the global positioning system (GPS) and described, e.g., in the document "Understanding GPS—Principles and Applications" by E. D. Kaplan, Norwood, Mass.: Artech House, 1996.

FIG. 1 illustrates an example of an A-GPS positioning system that is implemented in a cellular communication system 100, which in this case is a WCDMA system. In this system, the radio network controller (RNC) 105 acts as the node that collects, refines, and distributes assistance data to the terminals 110 (denoted user equipment (UE) in WCDMA) over the RRC interface 104 and reference GPS receivers 112 over the interface 102. For this purpose, the node 105 is equipped with a GPS interface 107. The core network (CN) 115 requests and reports positioning of a UE 110 over the RANAP interface 120 and, in response, the RNC 105 may use various kinds of A-GPS techniques. All these techniques build, however, on assistance data to be handled by a node in the cellular communication system. The RNC orders positioning measurements to be performed in the UE whereby the corresponding measurements are performed by dedicated A-GPS receiver hardware in the terminals. These receivers detect GPS transmissions, e.g. GPS ranging signals 109, from the satellites 108 that are also denoted space vehicles (SVs). GPS reference receivers 112 are attached to, e.g., the cellular communication system for collecting assistance data that enhances, when transmitted to the GPS receivers in terminals connected to the cellular communication system, the performance of the GPS terminal receivers. Additional assistance data is collected from the cellular communication system directly, typically to obtain a rough initial estimate of the position of the terminal together with a corresponding uncertainty of the initial estimate.

In positioning applications, the positioning method used by, e.g., the Radio Network Controller in a WCDMA Radio Access Network (RAN), determines the region where the terminal is located, said region expressed as one of the geometrical shapes known from the above-mentioned document 3GPP TS23.032. The selected geometrical shape is most often tied to the positioning method. For instance, the cell identity method normally reports the position of the terminal with a polygon representing the cell extension whereas the round trip time (RTT) positioning method normally exploits the ellipsoid arc shape. The need for shape conversion functionality arises because the end user, to whom the determined position is reported, may prefer other position formats than generated by the applied positioning method. As an example, an emergency center may require that the location of the caller is presented as a circular confidence area at a given confidence level. However, the output of a positioning method can be in another shape, for instance a polygon, an ellipsoid, or an ellipsoid arc. Furthermore the provided shapes may correspond to different confidence levels.

In a WCDMA system, the need for a flexible shape conversion functionality is rapidly increasing due to the introduction of new positioning methods. It can be expected that cell identity positioning as well as full support of UE based A-GPS will be provided and an addition of RTT positioning can be expected. The reported confidence regions of these positioning methods are cell polygon (cell ID), ellipse with or without altitude (A-GPS), and ellipsoid arc (RTT). At the same time, operator reporting requirements over the service interfaces, e.g. RANAP or PCAP, often require reporting in terms of point with uncertainty circle or ellipse with a specified value of the confidence. The following positioning methods and corresponding output shapes are planned to be implemented:

| Positioning method: | Output shape: |
|---|---|
| Cell ID positioning | Polygon shape |
| Cell ID and RTT positioning | Ellipsoid arc shape |
| UE-based A-GPS positioning | Ellipsoid point with ellipsoid uncertainty region |

At the same time, the following reporting requirements are present from operators:
  Report by means of a point with uncertainty circle (as required to be able to serve E-911 emergency positioning in North America);
  Report by means of an ellipsoid area (as required to be able to serve 112 emergency positioning);
  Report all shapes (in case of commercial location-based services).

SUMMARY

Due to the variety of available radio access system and various operator requirements it has been observed to be a problem that there is a correspondingly large variety of possible positioning reporting formats that need to be supported in a radio access network.

It is the object of the present invention to provide methods and arrangements for conversions of positioning information according to a first reporting format to a positioning information according to a second reporting format such as to allow a seamless transformation and handling of the positioning confidence values, i.e. the probability that the terminal is actually located in the region determined by the applied positioning method.

The method according to the invention is defined by the features of the independent claim 1.

Different embodiments of the invented method are defined by the independent claims.

The present invention implies the advantage to allow an improved and faster transformation between various positioning reporting formats.

It is thus also an advantage of the present invention to provide an increased flexibility in radio communication systems with regard to the reporting of positioning data. By handling of different confidence values of the positioning reporting formats before and after transformation the flexibility of the usage for operators is increased in terms of, e.g., QoS reporting implying advantages for the billing of positioning services.

By including several algorithms for transformation between positioning reporting shapes it is possible to build a complete operator configurable selection of transformations between a variety of standardized positioning reporting formats. This flexibility improves the possibility for operators to tailor the positioning functionality to different business models. It also improves interoperability between equipment from different vendors.

DETAILED DESCRIPTION

Shape Conversion

Ellipse to Point with Uncertainty Circle

Figure 4:
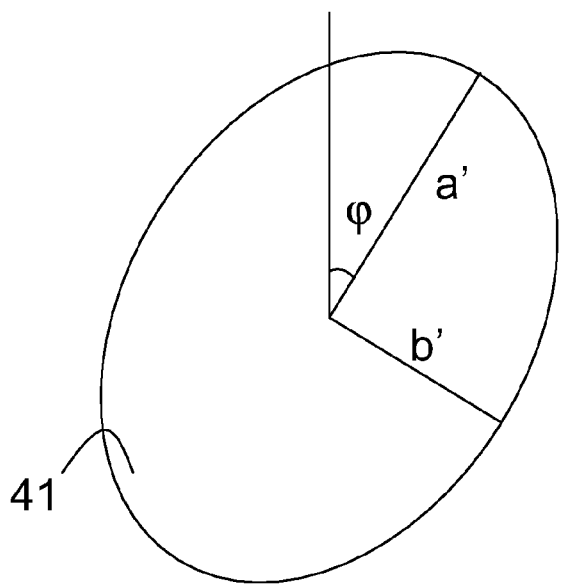
FIG. 4 illustrates a parameterized ellipse area.

The output of a position calculation function for time-based methods like GPS is normally a point with associated uncertainty area in the shape of an ellipse in two/three dimensions as described, e.g., in the document "Statistical Theory of Localization Systems", Torrieri, IEEE Trans. AES, Vol. AES-20, No. 2, March 1984. FIG. 4 shows an ellipse that is parameterized with a semi-major axis a', semi-minor axis b', and an angle $\phi$ relative to north, counted clockwise from the semi-major axis. The ellipse is given at a confidence level $P_e$.

Figure 1:
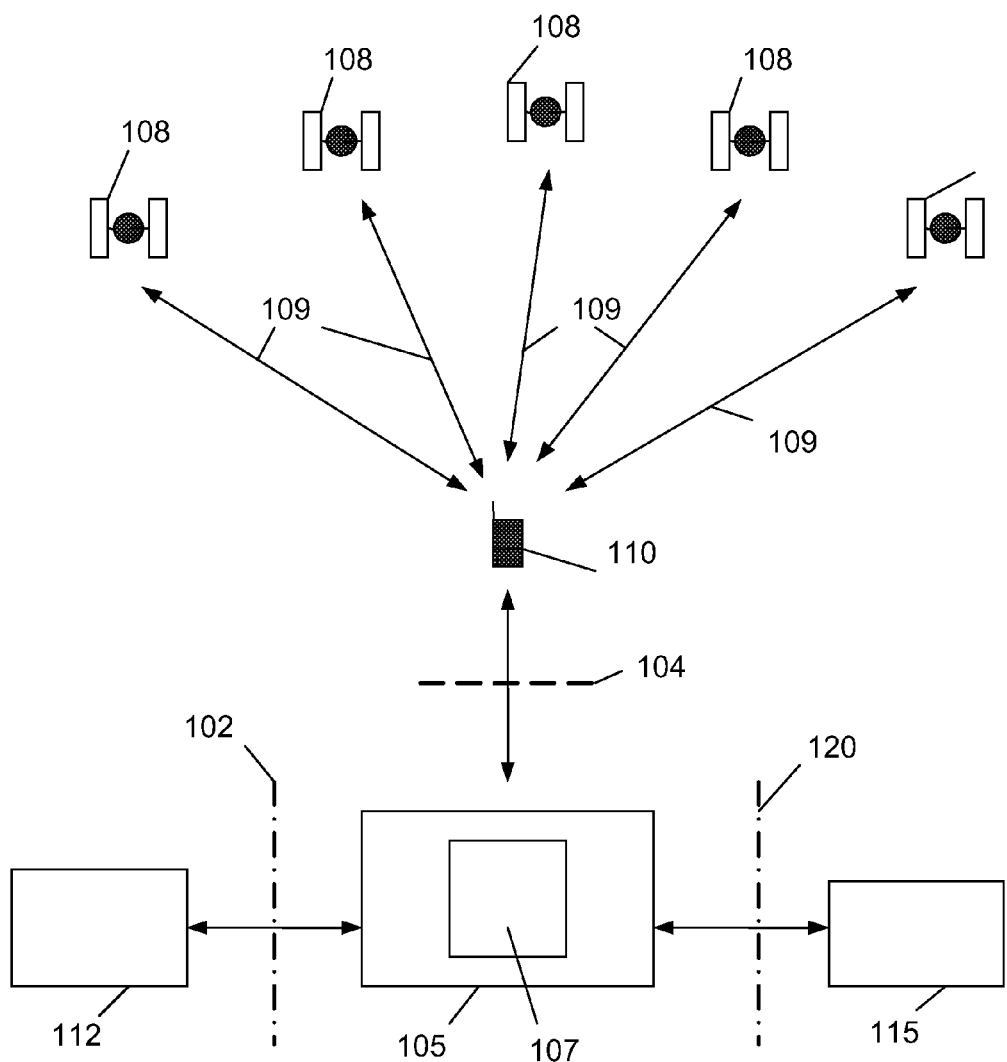
FIG. 1 illustrates an example of an A-GPS positioning system that is implemented in a cellular communication system.
Figure 2:
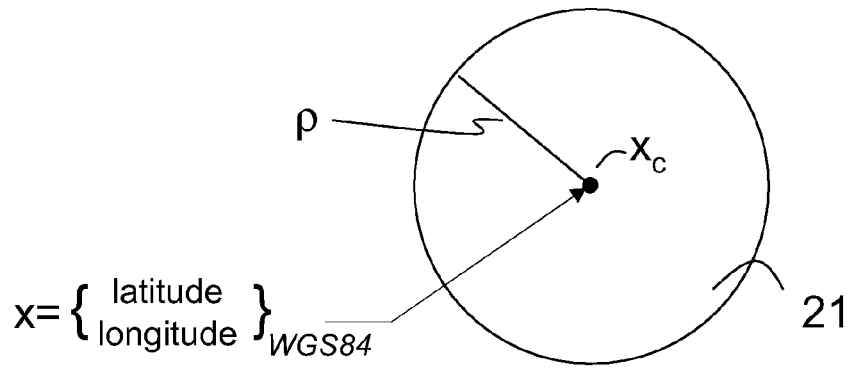
FIG. 2 illustrates a positioning reporting format by means of a point with uncertainty circle.

The following describes a conversion of an elliptical confidence area 41 as shown in FIG. 4 with a confidence level $P_e$ to a circular confidence area 21 as shown in FIG. 2 at another confidence level $P_c$. It is assumed herein that the underlying distribution is normal.

The present invention makes use of pre-created confidence tables $P_{ct}(\beta,\gamma)$ that are produced by repeatedly computing the probability function using a axis ratio $\beta$ between the semi-major axis a' and the semi-minor axis b' as parameters until a certain confidence level $P_c$ has been reached. As the angle $\phi$ does not affect the size of the circular confidence radius it is assumed that the angle $\phi$ is zero. The probability density function of the elliptical confidence area can be written as $$f(x, y) = \frac{1}{2\pi \cdot ab} \exp\left\{-\frac{1}{2}\left(\frac{x^2}{a^2} + \frac{y^2}{b^2}\right)\right\}.$$

Now, a circular area needs to be defined in such a way that its area covers the density function above with the probability $P_c$. It is thus required to calculate the radius $\rho$ for this circular area within which the UE is located with probability $P_c$ such that $P(\sqrt{x^2+y^2} \leq \rho) = P_c$ is valid.

This probability equation is cumbersome to evaluate with respect to $\rho$. Basically, what is required is to integrate this function two-dimensionally over x and y within a circle of radius $\rho$ and varying $\rho$ until the desired confidence level is reached. As this may not be feasible to do in real time, especially in cases where the calculation of the radius $\rho$ is to be performed in a mobile radio terminal, the following describes a simplified way to determine the radius $\rho$ of a circular area that fulfils the probability equation above, i.e. its confidence area corresponds to the elliptical confidence area.

By introducing the parameters $\beta = a/b$ and $\gamma = \rho/a$ it follows that $$F(\gamma) \equiv P(\sqrt{x^2+y^2} \leq \rho) = \int\int_{\sqrt{x^2+y^2} \leq a\gamma} \frac{1}{2\pi \cdot ab} \exp\left\{-\frac{1}{2}\left(\frac{x^2}{a^2} + \frac{y^2}{b^2}\right)\right\} dx\, dy$$

$$= \int\int_{\sqrt{x^2+y^2} \leq a\gamma} \frac{\beta}{2\pi \cdot a^2} \exp\left\{-\frac{1}{2a^2}(x^2 + \beta^2 y^2)\right\} dx\, dy.$$

When changing the integration variables (x,y) to polar coordinates (r,$\phi$), i.e. x=r cos $\phi$ and y=r sin $\phi$, and defining the Jacobian-matrix $$J = \left|\frac{\partial(x, y)}{\partial(r, \phi)}\right| = \left|\begin{matrix} \cos\phi & -r\sin\phi \\ \sin\phi & r\cos\phi \end{matrix}\right| = r$$

it follows:

$$F(\gamma) = \int\int_{\sqrt{x^2+y^2} \leq a\gamma} \frac{\beta}{2\pi \cdot a^2} \exp\left\{-\frac{1}{2a^2}(x^2 + \beta^2 y^2)\right\} dx\, dy$$

-continued $$= \frac{\beta}{2\pi \cdot a^2} \int_0^{2\pi} \int_0^{a\gamma} \exp\left\{-\frac{1}{2a^2}(r^2\cos^2\phi + \beta^2 r^2 \sin^2\phi)\right\} r\,dr\,d\phi$$

$$= \frac{\beta}{2\pi \cdot a^2} \int_0^{2\pi} \int_0^{a\gamma} \exp\left\{-\frac{c}{2a^2}r^2\right\} r\,dr\,d\phi;$$

$(c = \cos^2\phi + \beta^2 \sin^2\phi)$ $$= \frac{\beta}{2\pi \cdot a^2} \int_0^{2\pi} \left[-\frac{a^2}{c} \cdot \exp\left\{-\frac{c}{2a^2}r^2\right\}\right]_0^{a\gamma} d\phi$$

$$= \frac{\beta}{2\pi} \int_0^{2\pi} \frac{1}{c}\left(1 - \exp\left\{-\frac{c}{2}\gamma^2\right\}\right) d\phi$$

This integral is solved numerically whereby, for a number of values of the parameter $\beta$, $\gamma$ is varied until the desired confidence level $P_c$ is reached. This results in a table containing pairs of $(\beta,\gamma)$ that can be stored in a memory storage of the unit that is performing the shape conversion. A number of confidence tables $P_{ci}(\beta,\gamma)$ can be created by repeatedly calculating the probability function using $\beta=a/b$ as a parameter and varying $\gamma=\rho/a$ until the confidence level $P_{ci}$ has been reached. Each such confidence level table $P_{ci}$ is stored. When a certain confidence value is located between two tabulated confidence values $P_{ci}$ and $P_{ci+1}$ it is possible to interpolate the value of $\gamma$. The table below shows an exemplary table containing the normalized circular error probability radius $\gamma$ as a function of the ratio $\beta$ between major and minor axis at a 95% confidence level.

| β | γ |
|---|---|
| 1.0000 | 2.4477 |
| 1.2286 | 2.2434 |
| 1.5095 | 2.1193 |
| 1.8546 | 2.0516 |
| 2.2787 | 2.0157 |
| 2.7996 | 1.9952 |
| 3.4397 | 1.9826 |
| 4.2261 | 1.9747 |
| 5.1923 | 1.9696 |
| 6.3793 | 1.9663 |
| 7.8378 | 1.9642 |
| 9.6297 | 1.9627 |
| 11.8313 | 1.9618 |
| 14.5363 | 1.9612 |
| 17.8596 | 1.9608 |
| 21.9428 | 1.9605 |
| 26.9595 | 1.9603 |
| 33.1231 | 1.9602 |
| 40.6959 | 1.9601 |
| 50.0000 | 1.9601 |

Figure 9:
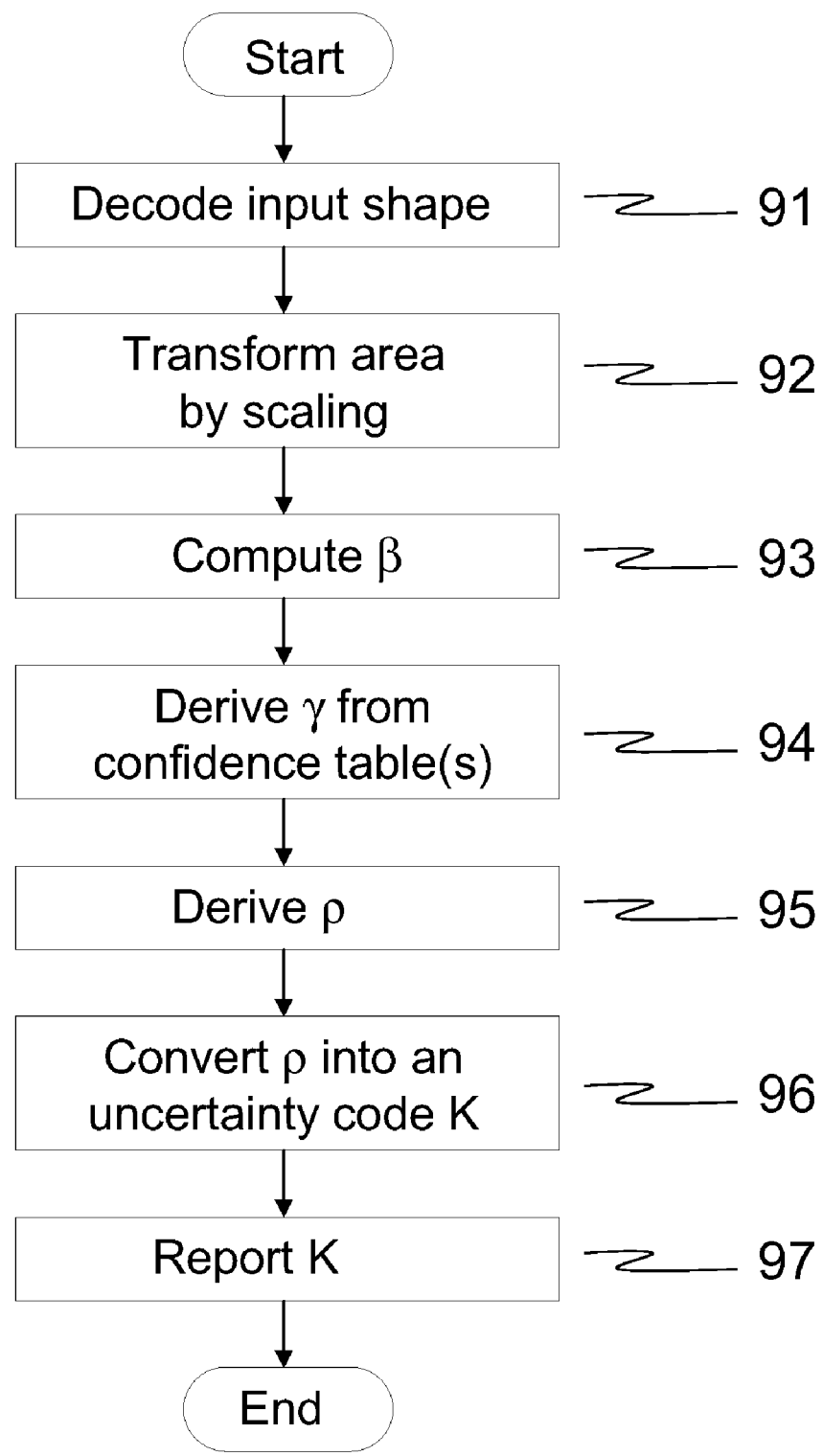
FIG. 9 illustrates a flowchart for a shape conversion from an ellipsoid to a point with uncertainty circle.

The shape conversion algorithm for converting an ellipsoid confidence area to a point with uncertainty circle area may comprise the steps that will be described in the following with reference to the flowchart of FIG. 9:

Step 91: Decode the input shape.

Step 92: Transform the ellipse parameters (a',b') into values (a,b) of the standard deviation for a normal distribution:

$a=a'/\sqrt{-2\ln(1-P_e)}, b=b'/\sqrt{-2\ln(1-P_e)}.$

Step 93: Compute $\beta=a/b$ by using the results of the transformation equation above.

Step 94: Derive $\gamma$ by using the stored tables of the computed $\beta$ and the confidence level $P_{ci}$. In those cases where $P_{ci}$ is located between two tabulated values for $P_{ci}$ it may be necessary to apply an interpolation for obtaining a value of $\gamma$.

Step 95: Derive the circle radius $\rho$ from the relation $\gamma=\rho/a$ ($\gamma$ and a have already been determined).

Step 96: Compute $\kappa=\log(1+(\rho/C))/\log(1+x)$ and derive the uncertainty code K as the integer value of $\kappa$. Where $\kappa$ does not result in an integer value, the integer K is derived by rounding $\kappa$ to the next higher integer. $\rho$ can then be converted into a value K of the uncertainty code by $\rho=C((1+x)^K-1)$.

Example values are C=10 and x=0,1 resulting in 0<K<127.

Step 97: Report K and the central point $x_c$ of the circular uncertainty area to the unit that has requested the location report.

By this, the shape conversion from an ellipsoid probability area to a point $x_c$ with uncertainty circle has been done.

Shape Conversion

Ellipsoid Arc to Point with Uncertainty Circle

Figure 3:
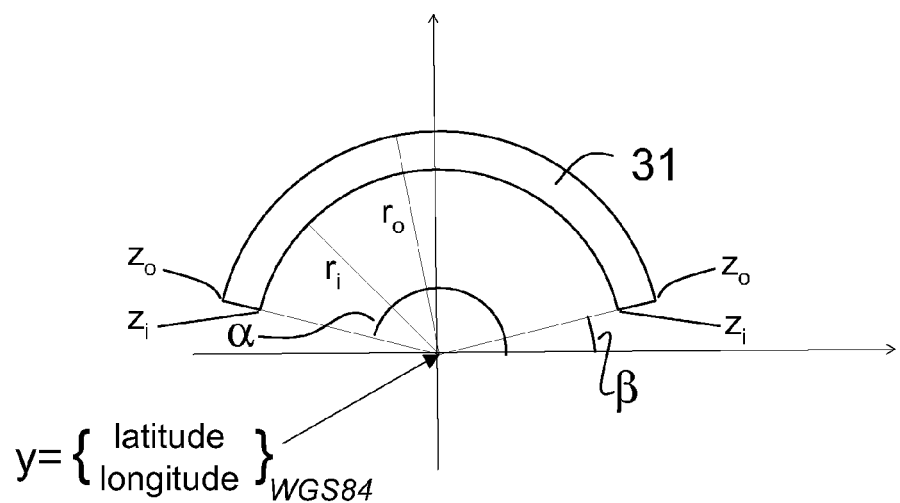
FIG. 3 illustrates a positioning reporting format by means of an ellipsoid arc.

This embodiment refers to the transformation from an "ellipsoid arc" format to a "point with uncertainty circle". The reporting formats used in the cellular standards GSM and WCDMA are described in detail in, e.g., the above-mentioned document 3GPP TS23.032. Related—but not identical—formats are illustrated in FIGS. 2 and 3. The reporting format specifies latitude and longitude information in a WGS 84 earth model. It does, however, not contain any altitude information.

FIG. 3 shows an ellipsoid arc 31 within which a UE is located with a defined probability and which shape is to be converted into the shape of FIG. 2 showing a point with uncertainty circle whereby the UE is located within the circular area with a defined probability.

Given the quantities $r_i, r_o, \alpha, \beta$, and y it is the task to find the point $x_c$ and the radius $\rho$ of the uncertainty circle 21 as shown in FIG. 2 that approximates the ellipsoid arc 31. Hereby, the radius $\rho$ shall be as small as possible while still enclosing the ellipsoid arc.

Figure 10:
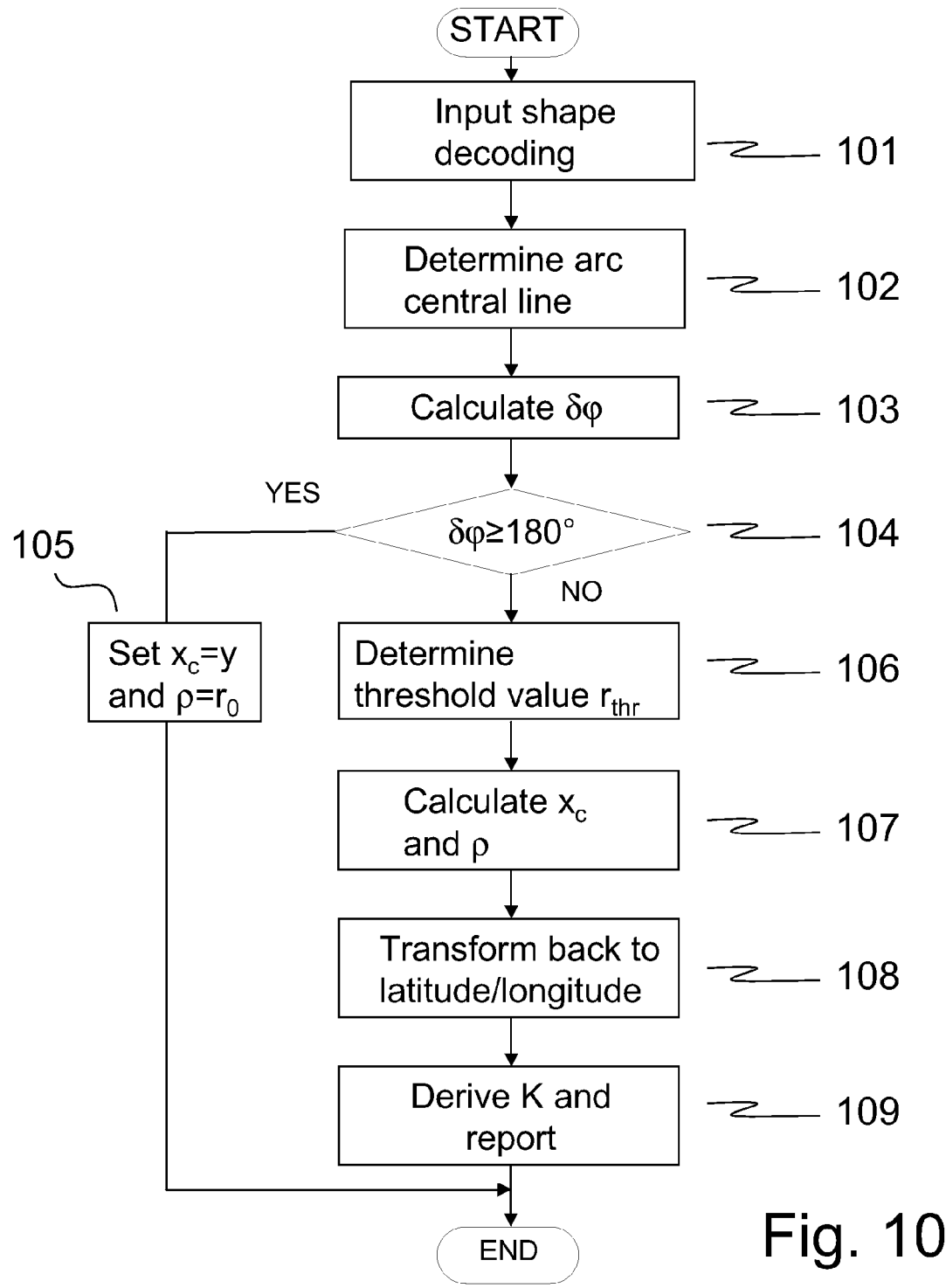
FIG. 10 illustrates a flowchart for a shape conversion from an ellipsoid arc to a point with uncertainty circle.

The shape conversion algorithm for converting an ellipsoid arc to a point with uncertainty circle may comprise the steps that will be described in the following with reference to the flowchart of FIG. 10.

Step 101: Decode the input shape.

As a prerequisite for the subsequent calculations it is assumed that the ellipsoid arc has been determined in such a way that the probability that the terminal is located somewhere in the circular strip has a requested value. The points that are given as latitude and longitude in the WGS 84 earth model have been transformed to a Cartesian (earth tangential) system.

Step 102: Determine the ellipsoid arc central line.

By applying symmetry considerations it follows that the point $x_c$ must be located somewhere on the ellipsoid arc central line segment fulfilling the requirements to start at the origin y;
form an angle $\phi=(\alpha+\beta)/2$ with the horizontal axis;
end at a radius of $r_o$ from the origin y.

These requirements can be expressed by a line $x_c=y+r_c\cdot\exp\{i\cdot\phi\}$ where $0<r_c<r_c$.

Step 103: Calculate the angular width $\delta\phi$ of the ellipsoid arc as $\delta\phi=\alpha-\beta$.

Figure 5:
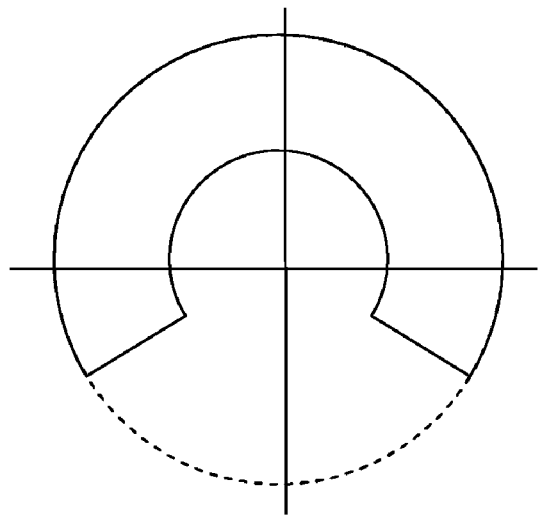
FIGS. 5-7 illustrate three possible cases for a shape conversion from an ellipsoid arc to a point with uncertainty circle.

Step 104: If the condition $\delta\phi\geq180°$ is true ("yes") it can be easily verified that the optimal values for the circular area are given by $x_c=y$ and $\rho=r_o$ (step 105). This case, i.e. the minimal circle for an angular arc width is larger than 180°, is illustrated in FIG. 5.

If the condition $\delta\phi\geq180°$ is not true ("no"), it is apparent that the circle can only intersect the ellipsoid arc at its inner and outer corners, i.e. at points $z_i$ and $z_o$ that are defined as $z_i=(y+r_i\cdot\exp(i\cdot\alpha), y+r_i\cdot\exp(i\cdot\beta))$ and $z_o=(y+r_o\cdot\exp(i\cdot\alpha), y+r_o\cdot\exp(i\cdot\beta)).$ Without loss of generality a translation and rotation of the coordinate system can be performed so that the corners corresponding to the angle α become $z_i = r_i \cdot \exp(i \cdot \delta\phi/2)$ and $z_o = r_o \cdot \exp(i \cdot \delta\phi/2)$, whereby the candidate points for $x_c = r_c$ lie along the real axis. The symmetry of the problem then shows that the distances from the line $x_c = y + r_c \cdot \exp(i \cdot \phi)$ to the inner corners (and also the outer corners) at angle α and β are equal. Therefore, the corners corresponding to the angle β do not need to be considered in the following. The squared distance from a point $x_c$ to $z_i$ and $z_o$ is given by $$d_i^2 = (r_c - r_i \cdot \cos(\delta\phi/2))^2 + r_i^2 \sin^2(\delta\phi/2) \text{ and}$$

$$d_o^2 = (r_c - r_o \cdot \cos(\delta\phi/2))^2 + r_o^2 \sin^2(\delta\phi/2).$$

As both squared distances are quadratic in $r_c$ there is at most one minimizing argument for $r_c$ within the admissible segment.

Step 106: Determine a threshold radius $r_{thr}$.

The distances $d_i^2$ and $d_o^2$ derived above are equal whenever the equation $$(r_c - r_i \cdot \cos(\delta\phi/2))^2 + r_i^2 \sin^2(\delta\phi/2) = (r_c - r_o \cdot \cos(\delta\phi/2))^2 + r_o^2 \sin^2(\delta\phi/2)$$

is valid, which requirement is fulfilled for a threshold radius $r_c = r_{thr}$ given by $r_c = r_{thr} = r_o^2 - r_i^2/(2 \cdot \cos(\delta\phi/2) \cdot (r_o - r_i))$.

Step 107: In the next step it is necessary to determine whether the inner corners or outer corners are the most distant to $x_c$ by using threshold value $r_{thr}$. For $r_c > r_{thr}$ the distance to $x_c$ is the largest from the inner corner $z_i$; otherwise, i.e. $r_c < r_{thr}$, the outer corner $z_o$ is most distant to $x_c$. Hence, $$\max(d_i^2, d_o^2) = d_i^2, \text{ for } r_c > r_{thr}$$

$$\max(d_i^2, d_o^2) = d_o^2, \text{ for } r_c < r_{thr}.$$

Next, the radius ρ can be determined by calculating the smallest distance to any of the corners along the line $x_c$.

The squared distance $d_i^2$ from a point $x_c$ to $z_i$ as defined above is minimized for $r_{ci} = r_i \cdot \cos(\delta\phi/2)$. Similarly, the squared distance $d_o^2$ from a point $x_c$ to $z_i$ is minimized for $r_{co} = r_o \cdot \cos(\delta\phi/2)$.

The corresponding radii are $\rho = r_i \cdot \sin(\delta\phi/2)$ and $\rho = r_o \cdot \sin(\delta\phi/2)$.

For $r_{co} < r_{thr}$, i.e. the outer corner distance is the largest, it holds that $$x_c = y + r_{co} \exp(i\phi) \text{ and } \rho = r_o \cdot \sin(\delta\phi/2) \text{ for } r_{co} < r_{thr}.$$

Otherwise, for $r_{co} > r_{thr}$, it must be checked whether the candidate $r_c$ meets the criterion $r_c < r_{thr}$. $r_c < r_{thr}$ means that the largest distance is to the outer corner. Further, the distance is minimized when $r_c = r_{thr}$. Since the squared distance is quadratic in $r_c$ the minimizing value is at $r_c = r_{co} > r_{thr}$. It can therefore be concluded that the minimizing radius is located at the border of these two segments, i.e. at $r_{ci} = r_{co} = r_{thr}$. Thus, for $r_{co} > r_{thr}$ it holds that $$x_c = y + r_{thr} \cdot \exp(i\phi) \text{ and } \rho = [(r_{thr} - r_i \cdot \cos(\delta\phi/2))^2 + (r_i \sin(\delta\phi))^2]^{1/2} \text{ for } r_{co} > r_{thr}.$$

Figure 6:
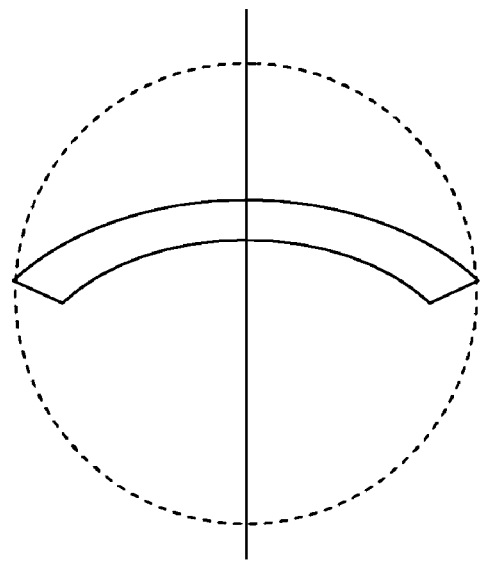
Figure 7:
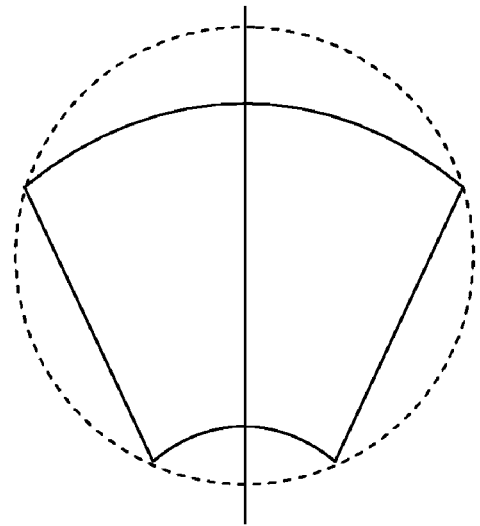

FIGS. 5-7 illustrate the three possible cases outlined above. FIG. 6 illustrates the minimal circle for the case where the outer corner determines the circle size. Finally, FIG. 7 illustrates the case where the minimal circle intersects both inner and outer corners.

Step 108: The center point $x_c$ derived from one of the alternatives above, whichever is applicable, is then transformed back from earth tangential coordinates to latitude longitude WGS 84 coordinates.

Step 109: Finally, ρ is mapped to an uncertainty code K as already described above.

Shape Conversion

Polygon to Ellipse

A polygon to ellipse transformation is based on a criterion minimization, i.e. a best fit of a parameterized ellipse to the corner data of a polygon is computed. The algorithm has a low complexity and allows for scaling of the confidence value.

The task is to transform a confidence region described as a polygon format and a confidence value for the polygon to a confidence region described by an ellipse format and a (possibly different) confidence value for the ellipse.

Figure 8A:
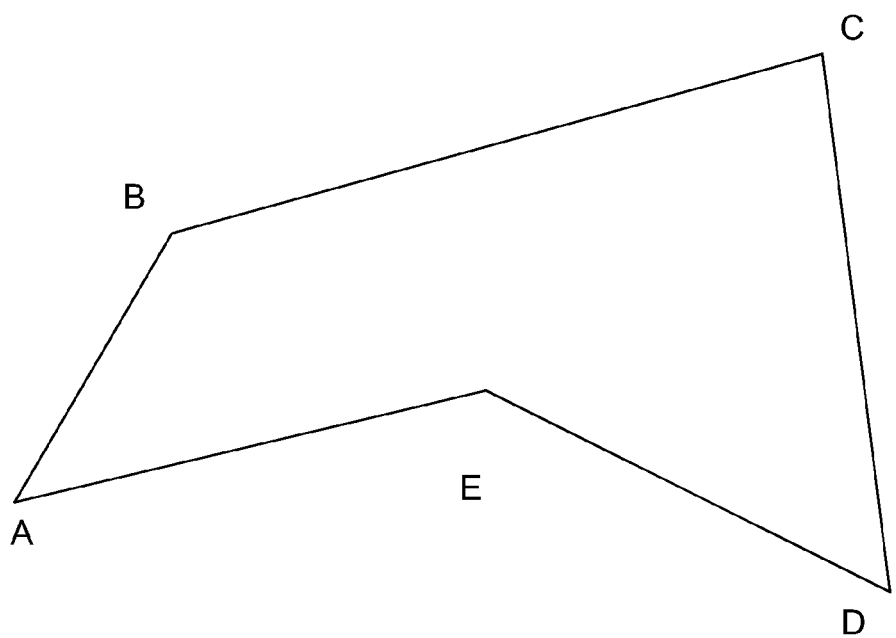
FIG. 8a illustrates a polygon area.

The polygon, e.g. as illustrated in FIG. 8a, is defined by a list of corners (here denoted A-E) in WGS 84 co-ordinates. No self-intersections are allowed. In the following description the corners are assumed to have been transformed to a local earth-tangential Cartesian co-ordinate system with coordinate axes in the north and east directions. This polygon shall now be transformed to an ellipse as in FIG. 4, said ellipse being parameterized in terms of a semi-major axis a', a semi-minor axis b', and an angel φ that is counted clockwise from north. In the following description φ is replaced by α=90−φ in order to get a normally oriented coordinate system.

Figure 11:
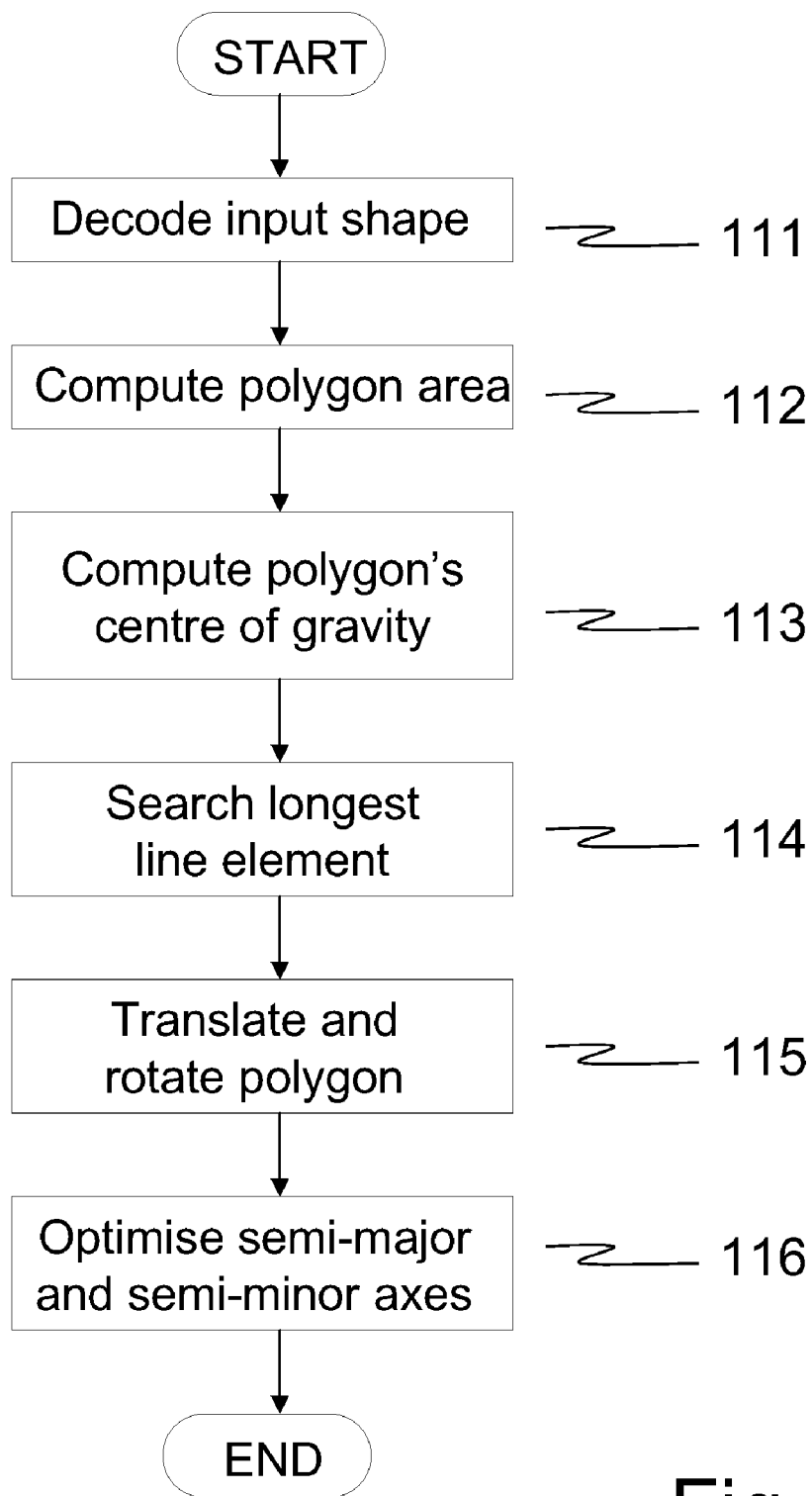
FIG. 11 illustrates a flowchart for a shape conversion from a polygon to an ellipsoid area.

The shape conversion algorithm for converting a polygon confidence area to an ellipse confidence area may comprise the steps that will be described in the following with reference to the flowchart of FIG. 11.

Step 111: The computation of the polygon area is performed by a division of the polygon into non-overlapping triangles as known from prior-art. The starting point is the corners of the polygon, expressed in a local earth tangential co-ordinate system and collected in a vector $$r_p = \begin{pmatrix} x_1 & \ldots & x_{N_p} \\ y_1 & \ldots & y_{N_p} \end{pmatrix}.$$

Step 112: The corresponding polygon area can be calculated as $$A_p = \frac{1}{2} \sum_{i=1}^{N_p} x_i y_{[i]_{N_p}+1} - x_{[i]_{N_p}+1} y_i,$$

whereby $[\ ]_{N_p}$ denotes the integer argument modulo the integer number $N_p$ of corners.

Step 113: The center of gravity $(x_{CG}, y_{CG})$ of the polygon can, by means of standard results, be based on a division of the polygon into non-overlapping triangles such that $$x_{CG} = \frac{1}{3A_p} \sum_{i=1}^{N_p} \left( x_i y_{[i]_{N_p}+1} - x_{[i]_{N_p}+1} y_i \right) \left( x_i + x_{[i]_{N_p}+1} \right)$$

$$y_{CG} = \frac{1}{3A_p} \sum_{i=1}^{N_p} \left( x_i y_{[i]_{N_p}+1} - x_{[i]_{N_p}+1} y_i \right) \left( y_i + y_{[i]_{N_p}+1} \right).$$

Step 114: Search for the longest line segment through the center of gravity with end points at the polygon boundary. This step determines the orientation of the semi-major axis, in terms of the angle $\alpha$. The idea is to search over a discrete set of lines that all pass through the center of gravity in order to find the line with the longest line segment with end points on the boundary of the polygon. This search is performed by:

- Selecting a number of angles that define the slopes of the lines passing through the center of gravity of the polygon;
- Determine the intersections between one of said lines passing through the center of gravity of the polygon and all line segments forming the sides of the polygon, repeated for all lines passing through the center of gravity of the polygon;
- Determine the longest line segment passing through the center of gravity and ending on the boundary of the polygon;
- Select the angle $\alpha$ as the angle generating said longest line segment.

Figure 8B:
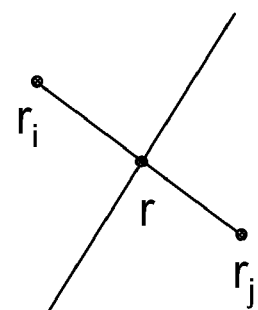
FIG. 8b illustrates an equation system for shape conversion from a polygon area to an ellipse area.

The steps described above can also be visualized by help of FIG. 8b illustrating the equation system $$r = r_{CG} + \beta \begin{pmatrix} \cos\alpha \\ \sin\alpha \end{pmatrix}$$

$$r = r_i + \delta(r_j - r_i).$$

If $\beta$ and $\delta$ are scalar parameters the solution to this system of equations is $$\begin{pmatrix} \beta \\ \delta \end{pmatrix} = \begin{pmatrix} \cos\alpha & r_i^x - r_j^x \\ \sin\alpha & r_i^y - r_j^y \end{pmatrix}^{-1} \begin{pmatrix} r_i^x - x_{CG} \\ r_i^y - y_{CG} \end{pmatrix}.$$

The superscripts x and y denote the x- and y-component of a vector, respectively. For a given $\alpha$ and a pair $(r_i, r_j)$ of corner points of the polygon, the parameters $\beta$ and $\delta$ are determined. Obviously, in case $\delta \in [0,1]$ the intersection falls between said corner points and is valid, otherwise it is discarded. The calculations of $\beta$ and $\delta$ are repeated for all line segments of the boundary of the polygon. Since the direction vector of the line through the center of gravity is normalized, it follows that the length of the line segment between the center of gravity and the boundary is given by the corresponding $\beta$. The intersections that generate the largest difference $l(\alpha) = \beta_k - \beta_1$ hence correspond to the sought candidate length for the angle $\alpha$. The angle $\alpha$ that renders the largest value of $l(\alpha)$ is determined by $$\alpha_e = \underset{\alpha}{\mathrm{argmax}}\, l(\alpha) = 90° - \alpha.$$

This value of $\alpha_e$ determines the orientation of the semi-major axis. The lengths of the semi-major and semi-minor axes are determined in a subsequent optimization step.

Step 115: Translation and rotation of the polygon. As a preparation for the subsequent optimization step, the polygon corners are transformed in such a way that the center of gravity of the polygon is moved to the origin of the coordinate system and such that the orientation of the semi-major axis coincides with the x-axis. This is achieved by the transformations $$r'_p = r_p - r_{CG} \text{ and } r''_p = \begin{pmatrix} \cos(\alpha_e) & \sin(\alpha_e) \\ -\sin(\alpha_e) & \cos(\alpha_e) \end{pmatrix} r'_p.$$

Step 116: Optimization of semi-major and semi-minor axes against polygon boundary.

In order to explain this step, the concept on confidence needs to be discussed. By definition, the confidence equals the probability that the terminal is actually located in the region that is determined and reported by the positioning method. The following two cases must not be confused: In case of cell ID positioning, the polygon regions are large and a reasonable assumption is that the distribution of users is uniform across the polygon. On the contrary, for A-GPS the reported elliptical uncertainty is related to a measurement error. In this case, the UE is distributed according to a multi-dimensional normal distribution over the uncertainty region. Within the scope of the present invention the case with a uniform distribution over a large region is the valid case.

The confidence value of the polygon is denoted $C_p$. The confidence value of the ellipse that is to be computed is denoted $C_e$. Since the distribution of users is assumed to be uniform, the following constraint holds for the areas of the polygon $A_p$ and the area $A_e$ of the ellipse:

$$A_e = \frac{C_e}{C_p} A_p.$$

From the definition of an ellipse area $A_e = \pi ab$ it follows that $$ab = \frac{C_e}{\pi C_p} A_p.$$

This equation now provides a constraint that can be used in order to eliminate one of the parameters a or b from the optimization problem below, thereby reducing this problem to one dimension. Further, $A_p$ is already available from step 111 of the algorithm. It is possible to calculate the semi-minor axis that provides the best fit according to the criterion $$V(b) = \frac{1}{N_p} \sum_{i=1}^{N_p} ((y_i'')^2 - (y_e(b, x_i''))^2)^2.$$

This criterion implies that the penalized error terms are differences between terms raised to an even power such as to be able to treat the area function as a single-branched function. The criterion above applies the square of the y-coordinates of the polygon and the ellipse model, however, when exchanging x and y in the criterion equation it is likewise possible to apply the criterion for deviations along the x-coordinate. Additionally, it is possible to apply a criterion that treats error terms in along both coordinates leading to an equation $$V_{xy}(b) = \frac{1}{N_p} \sum_{i=1}^{N_p} \left( [(y_i'')^2 - y_e(b, x_i'')^2]^2 + [(x_i'')^2 - x_e(b, y_i'')^2]^2 \right).$$

The optimization can be performed in a Cartesian but also in any other appropriate non-Cartesian coordinate system, e.g. a polar-coordinate system. As shown in the following, it is also possible to obtain an analytical solution.

The elliptical model $(y_e(b,x_i''))^2$ follows from the equation for the ellipsoid $$\frac{x^2}{a^2} + \frac{y^2}{b^2} = 1.$$

When back-substituted in the criterion defined above, the optimization problem can be posed as $$\hat{b} = \sqrt{\underset{b^2}{\operatorname{argmin}} \frac{1}{N_p} \sum_{i=1}^{N_p} \left((y_i'')^2 - (b^2) - (b^2)^2 \frac{\pi^2 C_p^2}{C_e^2 A_p^2}(x_i'')^2\right)^2}$$

after elimination of α.

A differentiation of the sum of squares with respect to $b^2$ and rearranging renders the following cubic equation in $b^2$:

$$\epsilon_0 + \epsilon_1(b^2) + \epsilon_2(b^2)^2 + \epsilon_3(b^2)^3 = 0$$

with the parameters $$\varepsilon_0 = -\sum_{i=1}^{N_p} (y_i'')^2,$$

$$\varepsilon_1 = \sum_{i=1}^{N_p} \left(1 + 2\frac{\pi^2 C_p^2}{C_e^2 A_p^2}(x_i'')^2(y_i'')^2\right)$$

$$\varepsilon_2 = -\sum_{i=1}^{N_p} 3\frac{\pi^2 C_p^2}{C_e^2 A_p^2}(x_i'')^2,$$

$$\varepsilon_3 = \sum_{i=1}^{N_p} 2\frac{\pi^4 C_p^4}{C_e^4 A_p^4}(x_i'')^4$$

The cubic equation can be solved analytically. In case there is more than one positive solution, the one that renders the smallest value of the criterion function is taken as the solution. With b determined as the minimizing solution to the equation, a can be computed as $$\hat{a} = \frac{1}{\pi}\frac{C_e}{C_p}A_p\frac{1}{\hat{b}}.$$

All parameters that define the ellipse $(a, b, \alpha_e)$ are now determined.

The following describes an extension of the method described above to furthermore improve the results. This extension modifies the confidence of the polygon according to $C_p^{Scaled} = SC_p$, whereby S is an area scale factor typically selected between 1.5 and 3. The effect is to secure that the area constraint does not force the ellipse to extend far outside the polygon during the optimization. Unless this is done, the ellipse area is placed along the semi-major axis outside of the polygon where there is no penalty of the criterion function that counteracts this tendency. After optimization, the semi-major and semi-minor length axes are re-scaled according to $$\hat{a}^{Rescaled} = \sqrt{S}\hat{a} \text{ and } \hat{b}^{Rescaled} = \sqrt{S}\hat{b}.$$

It is also possible to set a constraint in the x-dimension in addition to the constraint in y-dimension.

Figure 8C:
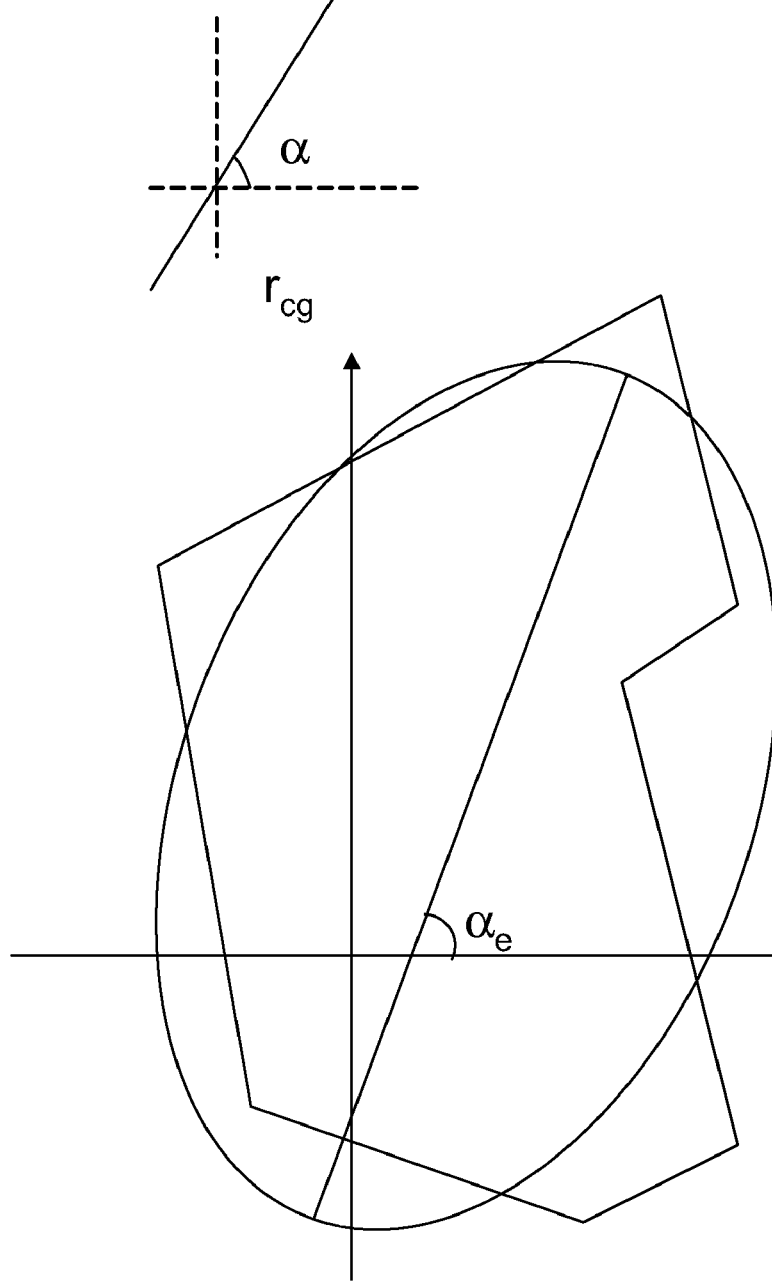
FIG. 8c illustrates an example of an ellipse obtained by a shape conversion from a polygon.

FIG. 8c shows an example of the ellipse obtained with the procedure above. The parameters were selected as $C_p = 0.8$, $C_e = 0.95$, $S = 2.0$.

According to a further alternative of this embodiment, the optimization can be extended to include also other points than corner points in the criterion, e.g. points taken on the boundary of the polygon. All such points can be defined as corner points by a division of the line segment on which the boundary point is located, into two pieces.

Shape Conversion

Ellipsoid Arc to Ellipse

The functionality described in the above section is easy to exploit in case a shape conversion between ellipsoid are and ellipsoid is required. Simply spread points around the boundary of the ellipsoid are and perform a shape conversion from the polygon, defined by said points and the ellipsoid.

The present invention also allows to subsequently performing more than one shape conversion, e.g. a shape conversion than first transforms a polygon reporting format to an ellipsoid reporting format and then to a point with uncertainty circle.

Figure 12:
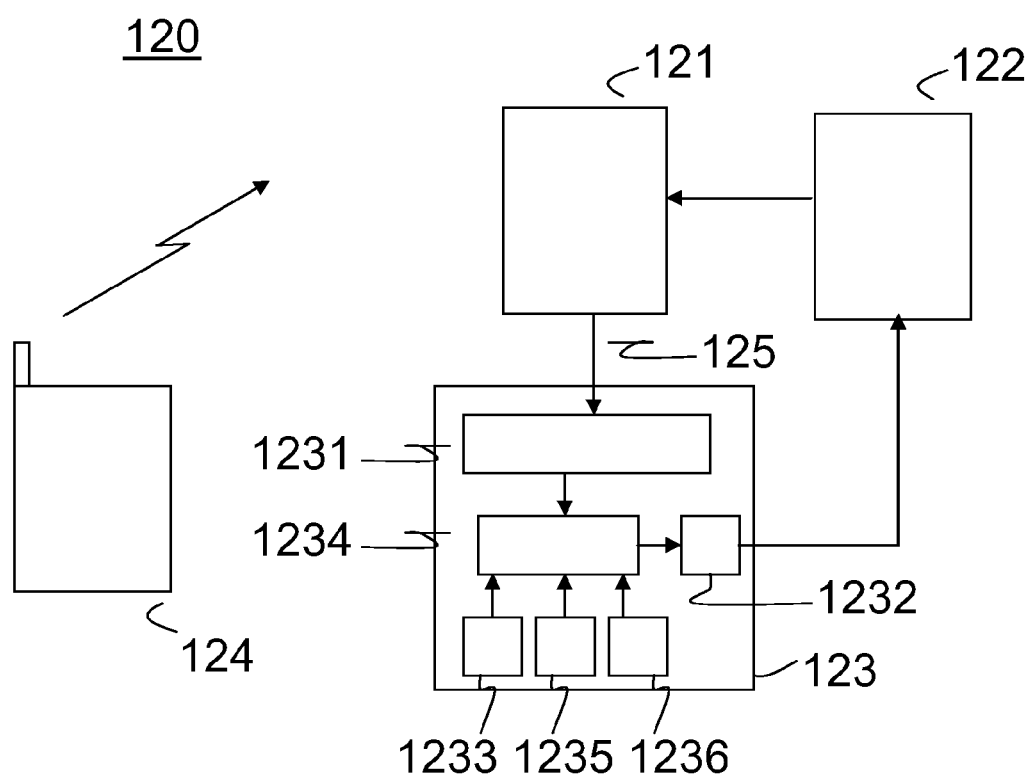
FIG. 12 illustrates a part of radio communication system within which the present invention can be performed.

FIG. 12 illustrates a radio communication system and the arrangement within which the present invention can be performed. Said radio communication system includes a positioning node 121 that is adapted to receive requests, e.g. from a requesting unit 122 requesting positioning information with a certain quality of service, to provide a positioning information for a certain user equipment 124. The positioning node 121 performs the positioning according to a selected method and reports according to a certain reporting format. A unit 123 according to the present invention includes a receiver 1231 for receiving from said positioning node 121 positioning information data of a user equipment 124 according to a first reporting format including at least an area shape information and a first confidence value, and includes a transmitter 1232 for providing to the requesting unit 122 positioning information data of said user equipment 124 according to the reporting format that has been requested by the requesting unit 122. For this purpose, said unit 123 includes a calculating unit 1234 that is adapted to derive an approximation of the shape-defining parameters for the second reporting format such as to minimize a criterion function including the predefined target confidence value and determining the deviation of the confidence value for the approximated shape from the target confidence value.

The unit 123 can be attached to said positioning node 121 by means of a wired or wireless communication connection 125, as depicted in FIG. 12 or can be an integrated part of said positioning node 121.

For shape conversions from an ellipse to a point with uncertainty circle, the unit 123 further comprising a memory storage 1233 for storing tables for various confidence values as derived above, said tables including the axis ratios of an ellipse according to a first reporting format and a normalized radius according to a second reporting format. For shape conversions from an ellipse to a point with uncertainty circle the unit 123 also comprises a converter 1235 to convert the normalized radius of the uncertainty circle into an integer-valued uncertainty code.

The embodiments described above are to be understood as illustrative examples. It will be understood by those skilled in the art that various modifications, combinations, and changes may be made to the embodiments without departing from the scope of the present invention. In particular, different part solutions in the different embodiments can be combined in other configurations, where technically possible. The scope of the present invention is defined by the appended claims.

The invention claimed is:

1. A method carried out by a unit integrated in or attached to a positioning node of a wireless communication system, the method comprising the steps of
   receiving from said positioning node positioning information data of a user equipment according to a first reporting format including at least an area shape information and a first confidence value;
   transforming said positioning information data of said user equipment to a second reporting format with different area shape and a second, predefined, target confidence value;
   sending said positioning information data according to the second reporting format to a requesting unit, and
   transforming said positioning information data including
      deriving an approximation of the shape-defining parameters for the second reporting format to minimize a criterion function including the predefined target confidence value, and
      determining the deviation of the confidence value for the approximated shape from the target confidence value.

2. The method according to claim 1, the criterion function minimizing the deviation of a probability function for the distribution of a positioning within an area according to the first reporting format from the target confidence value by varying the shape-defining parameter according to the second reporting format.

3. The method according to claim 2, whereby the shape-defining parameter of the second reporting format is approximated by a selection from a confidence table for the target confidence value and an appropriate shape-defining parameter of the first reporting format.

4. The method according to claim 3, whereby the area shape of the first reporting format is an ellipsoid and the area shape of the second reporting format is an uncertainty circle with a radius as shape-defining parameter, said radius normalized to the semi-major axis of the ellipsoid.

5. The method according to claim 4, further comprising the step of converting the normalized radius into an integer valued uncertainty code.

6. The method according to claim 1, whereby the criterion function minimizes, along a central line of the shape according to the first reporting format, the distance of the shape-defining parameter according to the second reporting format and the corners of the area shape according to the first reporting format depending on the angular width of the area according to the second reporting format.

7. The method according to claim 6, whereby the first reporting format is an ellipsoid arc and the second reporting format is a circular uncertainty area with a radius as shape defining parameter.

8. The method according to claim 1, whereby the criterion function minimizes shape deviations of the area according to the second reporting format in at least one direction, said deviations expressed as error terms raised to an even power.

9. The method according to claim 8, whereby the criterion function minimizes said shape deviations in one vertically oriented direction of a Cartesian coordinate system.

10. The method according to claim 8, comprising the step of scaling the target confidence value with an area scaling factor such as to place the area shape of the second reporting format within the area of the first reporting format.

11. The method according to claim 10, whereby scaling factor is selected within an interval of 1.5 to 3.

12. The method according to claim 8, whereby the area shape of the first reporting format is a polygon and the area shape of the second reporting format is an ellipse.

13. The method according to claim 12, comprising the steps of
   calculating the polygon area;
   determining the center of gravity of the polygon;
   determining the longest line segment through the center of gravity with end points at the polygon boundary;
   transforming the polygon corners such that said center of gravity is moved to the origin of the coordinate system and the semi-major axis of the ellipse coincides with the x-axis;
   optimizing the semi-major and semi-minor axes of the ellipse against the polygon boundary by means of minimizing said criterion function.

14. An apparatus included in a wireless communication system the apparatus comprising:
   a receiver for receiving from a positioning node positioning information data of a user equipment according to a first reporting format including at least an area shape information and a first confidence value;
   a transmitter for providing to a requesting unit positioning information data of said user equipment according to a second reporting format with different area shape and a second, predefined, target confidence value, and
   comprising
   a calculating unit adapted to derive an approximation of the shape-defining parameters for the second reporting format such as to minimize a criterion function including the predefined target confidence value and determining the deviation of the confidence value for the approximated shape from the target confidence value.

15. The apparatus according to claim 14, further comprising a memory storage for storing tables for various confidence values, said tables including the axis ratios of an ellipse according to a first reporting format and a normalized radius according to a second reporting format.

16. The apparatus according to claim 15, further comprising a converter to convert the normalized radius into an integer-valued uncertainty code.

17. The apparatus according to claim 14, further comprising a scaling unit adapted to scale said confidence value.

18. The apparatus according to claim 14, wherein said unit is integrated in said positioning node.

19. The apparatus according to claim 14, wherein said apparatus is arranged to establish a wired or wireless communication connection to said positioning node.

* * * * *